(12) United States Patent
Insana

(10) Patent No.: US 11,105,896 B2
(45) Date of Patent: Aug. 31, 2021

(54) TRAILER DETECTION AND ESTIMATION SYSTEM AND RELATED TECHNIQUES

(71) Applicant: Valeo Radar Systems, Inc., Troy, MI (US)

(72) Inventor: David Insana, Manchester, NH (US)

(73) Assignee: Valeo Radar Systems, Inc., Troy, MI (US)

( * ) Notice: Subject to any disclaimer, the term of this patent is extended or adjusted under 35 U.S.C. 154(b) by 233 days.

(21) Appl. No.: 16/386,615

(22) Filed: Apr. 17, 2019

(65) Prior Publication Data
US 2020/0333436 A1    Oct. 22, 2020

(51) Int. Cl.
| | |
|---|---|
| *G01S 7/40* | (2006.01) |
| *G01S 7/41* | (2006.01) |
| *G01S 13/931* | (2020.01) |
| *G01S 13/89* | (2006.01) |
| *G01S 7/288* | (2006.01) |
| *G01B 7/02* | (2006.01) |
| *G01S 13/44* | (2006.01) |

(52) U.S. Cl.
CPC ............... *G01S 7/411* (2013.01); *G01B 7/02* (2013.01); *G01S 7/288* (2013.01); *G01S 7/40* (2013.01); *G01S 13/449* (2013.01); *G01S 13/89* (2013.01); *G01S 13/931* (2013.01); *G01S 7/2883* (2021.05)

(58) Field of Classification Search
CPC ......... G01B 15/00; G01B 7/02; G01S 13/449; G01S 13/89; G01S 13/931; G01S 2007/2883; G01S 7/288; G01S 7/40; G01S 7/411
See application file for complete search history.

(56) References Cited

U.S. PATENT DOCUMENTS

| | | | |
|---|---|---|---|
| 6,683,557 B2 | 1/2004 | Pleva et al. | |
| 6,816,107 B2 | 11/2004 | Pleva et al. | |
| 6,977,609 B2 | 12/2005 | Pleva et al. | |
| 7,071,068 B2 | 7/2006 | Jeong | |
| 2011/0257860 A1* | 10/2011 | Getman | G01S 13/931 701/70 |
| 2015/0070207 A1* | 3/2015 | Millar | G01S 13/4454 342/174 |

(Continued)

OTHER PUBLICATIONS

Eckert et al., "Efficient Illumination Angle Self-Calibration in Fourier Ptychography;" Research Article in Applied Optics, vol. 57, No. 19; Jul. 1, 2018; 9 Pages.

*Primary Examiner* — Timothy A Brainard
(74) *Attorney, Agent, or Firm* — Daly, Crowley, Mofford & Durkee, LLP

(57) ABSTRACT

A method and apparatus for detecting and estimating the dimension of a trailer are presented. The method includes: capturing information on surrounding static infrastructure; determining the existence of a trailer based upon the captured information on the surrounding static infrastructure. When it is determined that a trailer is present, the method further includes: filtering detections associated with the existence of the trailer; identifying one or more regions on a trailer based upon the filtered detections, the regions corresponding to repeated reflections having an amplitude equal to or greater than a predetermined amplitude threshold with a substantially constant range relative to a fixed origin; and determining at least one of a width, length, and height of the trailer based on the identified regions.

10 Claims, 11 Drawing Sheets

(56) References Cited

U.S. PATENT DOCUMENTS

| | | | |
|---|---|---|---|
| 2016/0041258 A1* | 2/2016 | Cashler | G01S 7/521 |
| | | | 342/70 |
| 2016/0084943 A1* | 3/2016 | Arage | G01S 13/42 |
| | | | 342/102 |
| 2017/0320518 A1* | 11/2017 | Lavoie | B62D 13/06 |
| 2019/0170867 A1* | 6/2019 | Wang | G01S 13/878 |

* cited by examiner

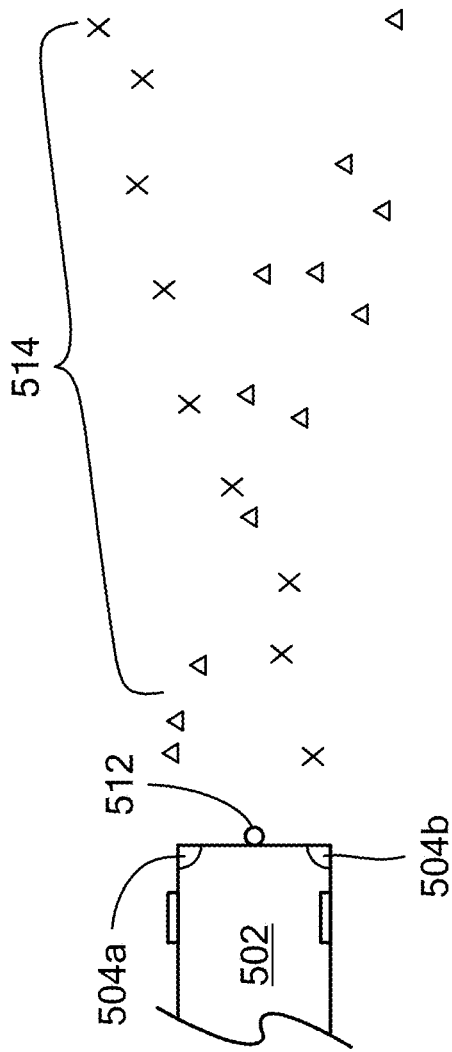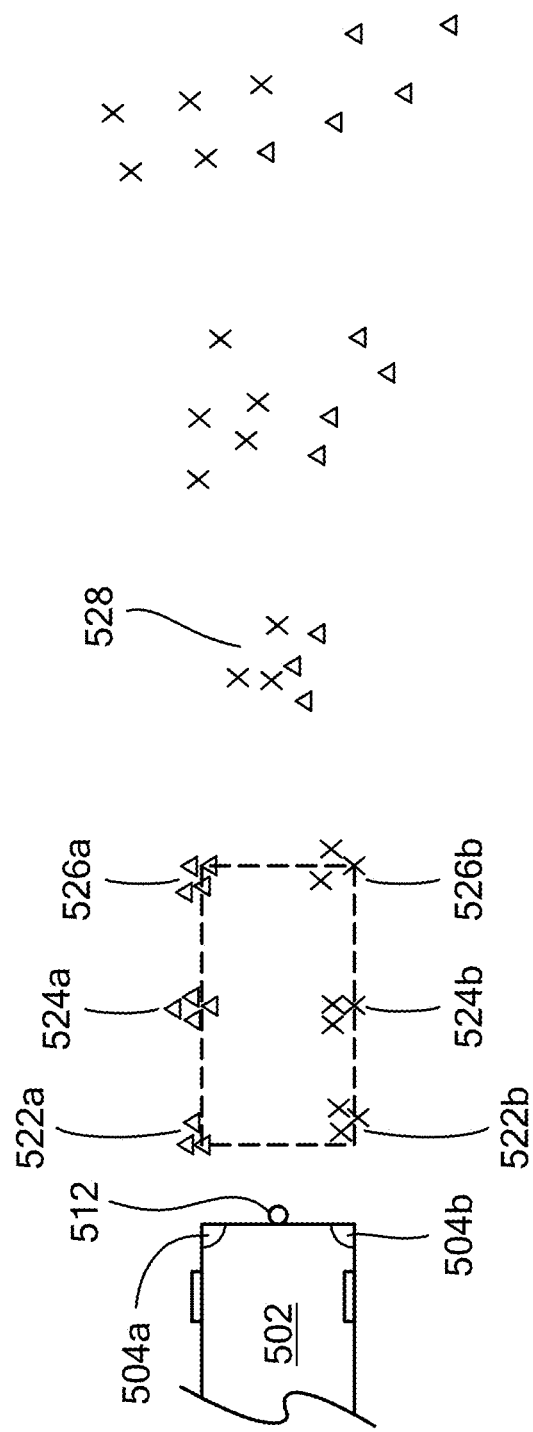
FIG. 5A
FIG. 5B

TRAILER DETECTION AND ESTIMATION SYSTEM AND RELATED TECHNIQUES

TECHNICAL FIELD

The concepts, systems, circuits, devices and techniques described herein relate generally to automotive radar systems and more particularly to a solution for detecting the presence of a trailer using an automotive radar system.

BACKGROUND

A trailer may be attached or hooked to a vehicle using a hitch. The presence of the trailer may be detected using an electrical solution through an interface to the hitch, which requires a physical connection of the wire harness to determine the presence of the trailer. In addition to requiring an electrical connection, such an electrical solution cannot determine the dimension of the trailer.

As is known in the art, automotive radar systems may detect targets which are within the radar system's field-of-view (FoV) and which produce radar return signals. When a trailer is attached to a vehicle and is within a radar system's FoV, regions of the trailer will produce such radar return signals. The reflections may be used to determine the presence of a trailer and also to estimate dimensions of the trailer.

U.S. Patent Publication No. 2016/0041258 discloses a radar detection system for detecting the presence of a trailer. The presence of a trailer is detected by analyzing detections at zero range.

SUMMARY

In accordance with the concepts, techniques and systems sought to be protected, described is an efficient method for detecting the presence of a trailer coupled to a vehicle equipped with an automotive radar sensor. The techniques and systems described herein may detect the presence of a trailer using a radar sensor and also may estimate at least one of width, length, and height of the trailer.

The concepts presented herein may utilize a process to detect the presence of a trailer. The trailer detection process may capture (i.e. detect the presence of) static infrastructure surrounding a subject vehicle. If the infrastructure is seen by the radar sensor without any obstruction by a trailer, the quality from the detection mechanism is not degraded. If a trailer is present, the clutter ridge image caused by the blockage of the trailer in the field of view of the sensor is smeared (i.e. the radar sensor detections which form the trailer-caused clutter ridge are spread apart) and can therefore be distinguished from the non-blocked clutter ridge (i.e. a clutter ridge formed as a result of radar sensor detections caused by static infrastructure other than a trailer). Additionally, after detecting the presence of a trailer, at least one of length, width, and height of the trailer can be estimated by detecting radar returns representing repeated reflections with an amplitude equal to or greater than a threshold value within a substantially constant range based upon histograms that are generated by converting range and azimuth values of detections.

In an embodiment, the process to detect the presence of a trailer may comprise an Angle Self Calibration (ASC) quality analysis process. The ASC analysis may capture surrounding static infrastructure by integrating Fast Fourier Transform (FFT) data into a Doppler vs. monopulse angle image space.

According to one illustrative embodiment, a method may include: capturing information on surrounding static infrastructure; determining an existence of a trailer based upon the captured information on the surrounding static infrastructure. The method may further include, in response to the existence of the trailer, filtering detections associated with the existence of the trailer; identifying one or more regions on a trailer based upon the filtered detections, the regions corresponding to repeated reflections having an amplitude equal to or greater than a predetermined amplitude threshold with a substantially constant range relative to a fixed origin; and determining at least one of a width, length, and height of the trailer based on the identified regions.

In embodiments, the existence of the trailer may be determined using Angle Self Calibration (ASC) quality analysis.

In embodiments, the method may further include adjusting alert zone for the vehicle based upon the at least one of width, length, and height of the trailer.

In embodiments, the step of filtering detections may further include filtering detections beyond expected dimension of the trailer.

In embodiments, the step of filtering detections may further include filtering detections having Doppler effect equal to or greater than a Doppler threshold.

In embodiments, the step of identifying one or more regions on a trailer may further include: determining a yaw rate associated with the filtered detections; in response to the yaw rate greater than or equal to a predetermined yaw rate threshold: translating detected coordinates associated with the trailer relative to the fixed origin; updating a range histogram in a radial range based upon the filtered detections; and in response to the yaw rate smaller than the predetermined yaw rate threshold: updating at least one of X and Y histograms based upon the filtered detections; forcing the range histogram, X histogram and/or Y histogram to be refreshed; and determining the one or more regions based upon the filtered detections.

According to another illustrative embodiment, a sensor may include: a transceiver configured to transmit signals to and receive reflection signals from surrounding static infrastructure; and a signal processor configured to receive the reflection signals from the transceiver. Here, the signal processor may be configured to: capture information on the surrounding static infrastructure; a trailer detection processor configured to receive the captured information from the signal processor, said trailer detection processor configured to determine an existence of a trailer based upon the captured information on the surrounding static infrastructure; in response to the existence of the trailer: filter detections associated with the existence of the trailer; identify one or more regions on a trailer based upon the filtered detections, the regions corresponding to repeated reflections having an amplitude equal to or greater than a predetermined amplitude threshold with a substantially constant range relative to a fixed origin; and determine at least one of a width, length, and height of the trailer based on the identified regions.

In embodiments, the trailer detection processor may be further configured to: adjust alert zone for the vehicle based upon the at least one of width, length, and height of the trailer.

In embodiments, the trailer detection processor may be coupled to a user interface that is configured to: display the determined width, length, and height of the trailer. Here, the user interface may be further configured to: display the information on surrounding static infrastructure captured by the signal processor.

In embodiments, the sensor may further include a second transceiver. Here, the transceiver may transfer additional reflection signals from the second transceiver and the signal processor may use the additional reflection signals to capture information on the surrounding static infrastructure.

The details of one or more embodiments of the disclosure are outlined in the accompanying drawings and the description below. Other features, objects, and advantages of the disclosure will be apparent from the description and drawings, and from the claims.

BRIEF DESCRIPTION OF THE DRAWINGS

The foregoing features may be more fully understood from the following description of the drawings in which:

FIG. 5A is a diagram representing results of the trailer detection process, in the absence of a trailer, which process may be the same as or similar to the process described in conjunction with FIG. 3;

FIG. 5B is a diagram representing results of a trailer detection process, in the presence of a trailer, which process may be the same as or similar to the process described in conjunction with FIG. 3;

DETAILED DESCRIPTION

Figure 1:
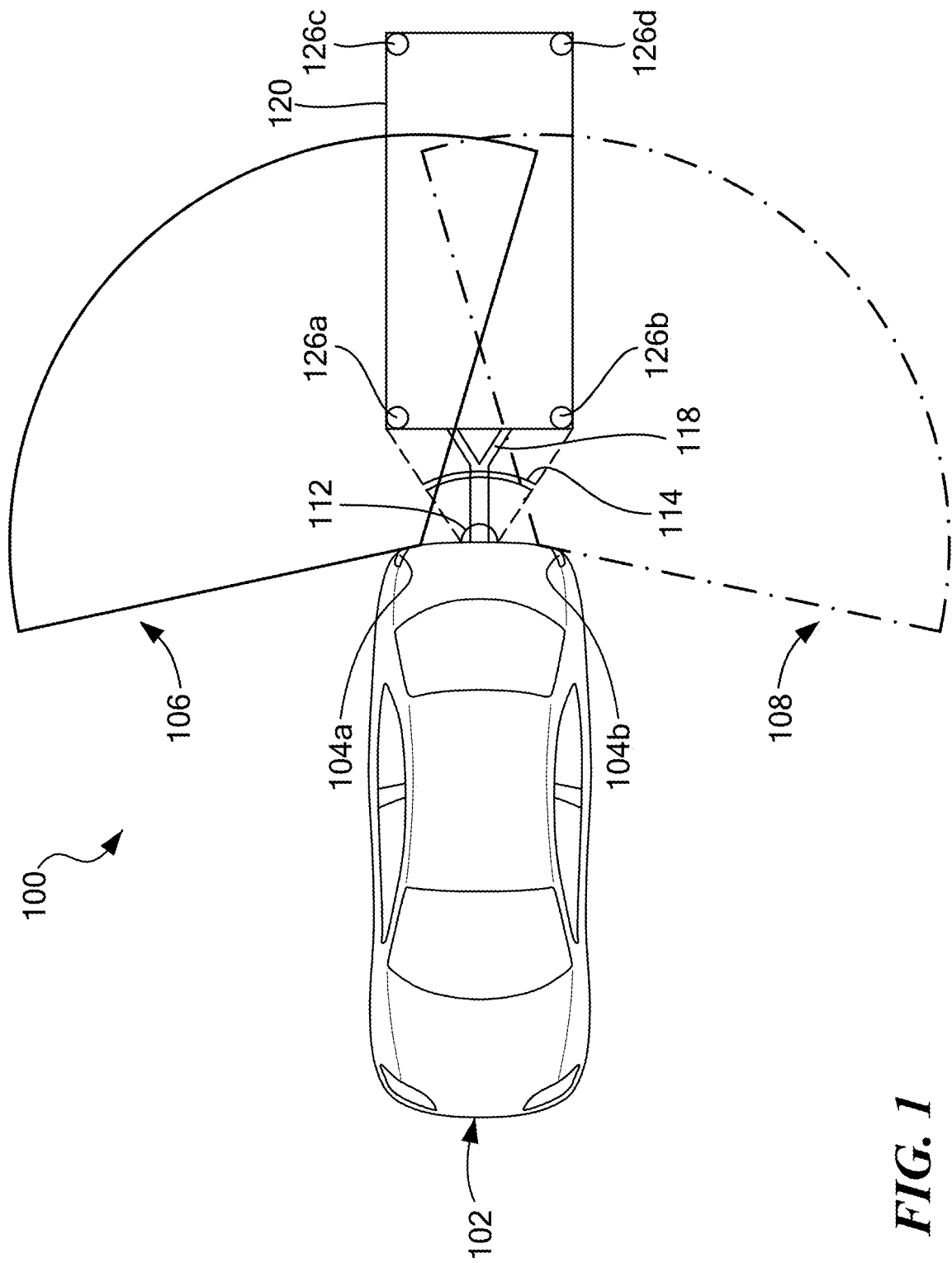
FIG. 1 is a diagram illustrating a vehicle having a trailer coupled thereto and also having a pair of vehicle radar sensors mounted thereon with each of the automotive radar sensors having a field of view.

All relative descriptions herein, such as left, right, up, and down, are with reference to the figures, are merely relative and not meant in a limiting sense. Additionally, for clarity, common items and circuitry, such as integrated circuits, resistors, capacitors, transistors, and the like, have not been included in the figures, as can be appreciated by those of ordinary skill in the pertinent art. Unless otherwise specified, the described embodiments may be understood as providing illustrative features of varying detail of certain embodiments, and therefore, unless otherwise specified, features, components, modules, elements, and/or aspects of the illustrations can be otherwise combined, interconnected, sequenced, separated, interchanged, positioned, and/or rearranged without materially departing from the disclosed concepts, systems, or methods. Additionally, the shapes and sizes of components are intended to be only illustrative and unless otherwise specified, can be altered without materially affecting or limiting the scope of the concepts sought to be protected herein.

For convenience, certain introductory concepts and terms used in the specification are collected here.

As used herein, the term "clutter" is used to describe reflections (or radar return signals) received in a radar system and not caused by an object of interest (or "target") of the radar system. Such reflections may be unexpected reflections and may be caused by radar signal reflections caused by the ground, rain, snow, animals/insects, atmospheric turbulence or other objects. Clutter may degrade the performance of a radar system and thus clutter filtering may be necessary to detect a target. Clutter filtering may use the fact that some objects, such as the ground, do not move (i.e., the objects are stationary). Such stationary objects are sometimes referred to herein as "static infrastructure." Clutter due to the static infrastructure may occupy a zero Doppler bin. The zero Doppler bin may thus be utilized to implement various Doppler-based clutter filtering techniques.

However, when a radar system itself also moves, such as in a vehicle, the Doppler component in the returns from static infrastructure may have different values than zero. In this case, the Doppler components of clutter returns may be angle dependent. In the angle-Doppler response, which is generated by scanning all ranges and azimuth angles for a given elevation angle (and ideally by scanning all ranges and azimuth angles for a given elevation angle), the clutter return may occupy not only a zero Doppler bin, but also other non-zero Doppler bins. Herein, the Doppler of clutter may form a pattern, (e.g. a line), in the Doppler space. The term "clutter ridge" is used to describe the pattern created by the clutter return from static infrastructure.

As used herein, the term "Doppler Monopulse Image (DMI)" is used to describe a "mapping" (i.e., transformation) of Fast Fourier Transform (FFT) energy data to an "unwrapped" Doppler and "unwrapped" phase difference two-dimension (2D) image space. The phase difference is a difference in the phases of the two receive channels complex FFT bin values. In this context, the term "unwrapped" refers to the fact that ambiguities in both the phase data and Doppler data have been removed. The Doppler is a normalized Doppler generated by dividing the radial range rate by the speed of the host vehicle (e.g., as reported over a vehicle car area network (CAN)). The resultant pattern in the image is a mapping of the surrounding static infrastructure known as a clutter ridge (as illustrated in FIG. 3A). The infrastructure-related information collected by a sensor may be used to generate a pattern of clutter ridge in a DMI. Some or most of the information plotted on the DMI will be concentrated about a clutter ridge line. In embodiments, the "clutter ridge" contains information about or is based upon the mounting angle of the sensor, the angle distortion of the sensor and its mounting environment, and the quality of the angle measurement process. For monopulse angle measurement, mounting angle causes a shift in the clutter ridge, antenna spacing error causes a twist, and multiple internal reflections cause angle ripples. For Doppler angle measurement, errors include vehicle speed estimate errors and reflections from objects that cannot be approximated as point targets. The clutter ridge may be compared to an original phase curve associated with the sensor (e.g., a curve measured during a manufacturing process or other sensor-oriented test procedure) to determine an actual mounting angle associated with the sensor on the vehicle.

Referring now to FIG. 1, a subject vehicle 102 is equipped with one or more radar sensors 104a, 104b (generally denoted 104). A trailer 120 is attached the vehicle 102. In this illustrative embodiment, trailer 120 is attached to vehicle 102 using a hitch 118. However, any means for attaching trailer 120 to vehicle 102 may be used.

In an embodiment, the vehicle may have a plurality of sensors arranged to detect objects in a rear portion of the vehicle 102 (i.e., behind vehicle 102). In the illustrative embodiment of FIG. 1, first and second rear-side sensors 104a, 104b are arranged in a rear portion of vehicle 102. While a radar system using two sensors are shown and described, it should be appreciated that the system could be used with only a single sensor or any number of sensors greater than two. Further, while object detection at a rear of a vehicle is described, it should be appreciated that the same concepts may equally apply to detection of an object by sensors deployed at the front of a vehicle. Such a sensing system disposed for operation at the front of a vehicle (e.g., in a vehicle moving in a forward direction), may be useful in autonomous driving applications and for object detection at low speed in general.

Sensor 104a has a first field of view 106 while sensor 104b has a second field of view 108. Within each of the field of views, the sensors 104a, 104b may detect one or more objects (or targets). When one of sensors 104a, 104b detects a target, the sensor collects information on the target based upon reflections (or "return signals") from radar signals emitted by one or both of the sensors 104a, 104b.

The sensors 104a, 104b may collect information on infrastructure surrounding the vehicle 102 and within a field of view of the sensor. Infrastructure may include, but is not limited to, the ground, a street sign, buildings, guard rails, and other objects around the vehicle 102.

When a trailer 120 is attached to the vehicle 102, radar signals emitted by the rear-side radar sensors 104a, 104b may be reflected by portions of the trailer 120. In embodiments, the corners 126a, 126b, 126c, 126d of the trailer 120 may produce distinguishable reflections than other regions of the trailer (i.e. trailer corner regions may produce radar return signals having amplitudes which are relatively large compared with return signals resultant from other portions of the trailer). In other embodiments, other regions of the trailer, such as a pole or shaft projecting from a trailer (e.g., an open-type trailer), may produce more distinguishable reflections. As the trailer 120 is connected to the vehicle by the hitch 118, the trailer 120 may move freely within a certain angular region 114 relative to the connection point 112 of the trailer 120 to the hitch 118.

Figure 1A:
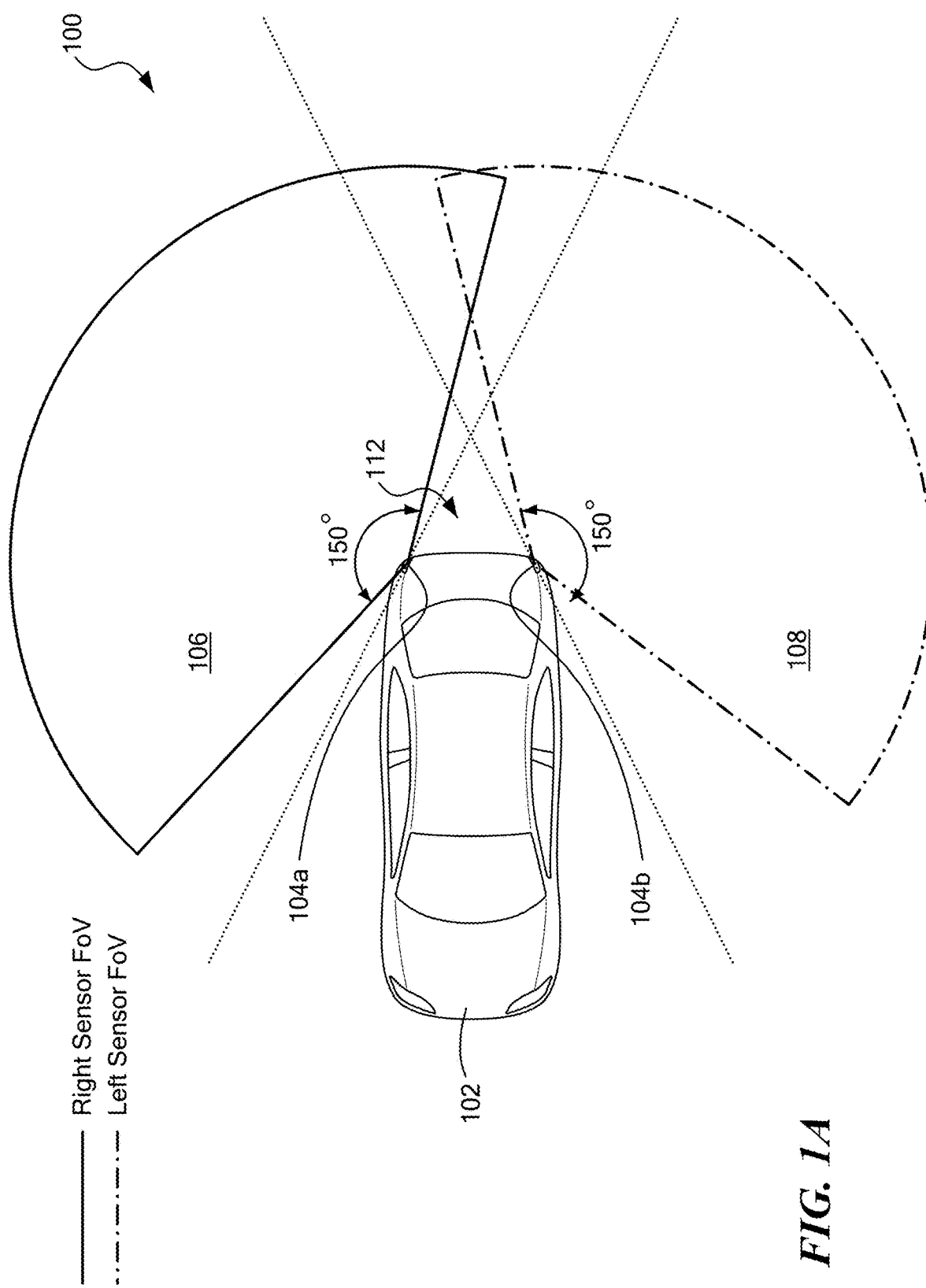
FIG. 1A is a diagram illustrating a vehicle having a pair of vehicle radar sensors mounted thereon with each of the automotive radar sensors having a field of view which covers a physical region in the rear of the vehicle.

Referring now to FIG. 1A, fields of view of the vehicle 102 and the sensors 104a, 104b are shown in more detail. As shown, a subject vehicle 102 is equipped within one or more radar sensors (generally denoted 104), with a first sensor 104a and a second sensor 104b. The first field of view 106 is shown for sensor 104a and the second field of view 108 is shown for sensor 104b. There is an area of overlap 110 for the two fields of view 106 and 108. There is also an area 112 between the fields of view of sensors 104a and 104b. In some embodiments, each field of view 106 and 108 may have approximately a 150-degree area, with 22 degrees of each field of view overlapping. In other embodiments, each field of view 106 and 108 may have a different degree with an overlapping area of another different degree. The particular field of view produced by a radar sensor is, of course, determined by the characteristics of the particular radar sensor being used.

Figure 2:
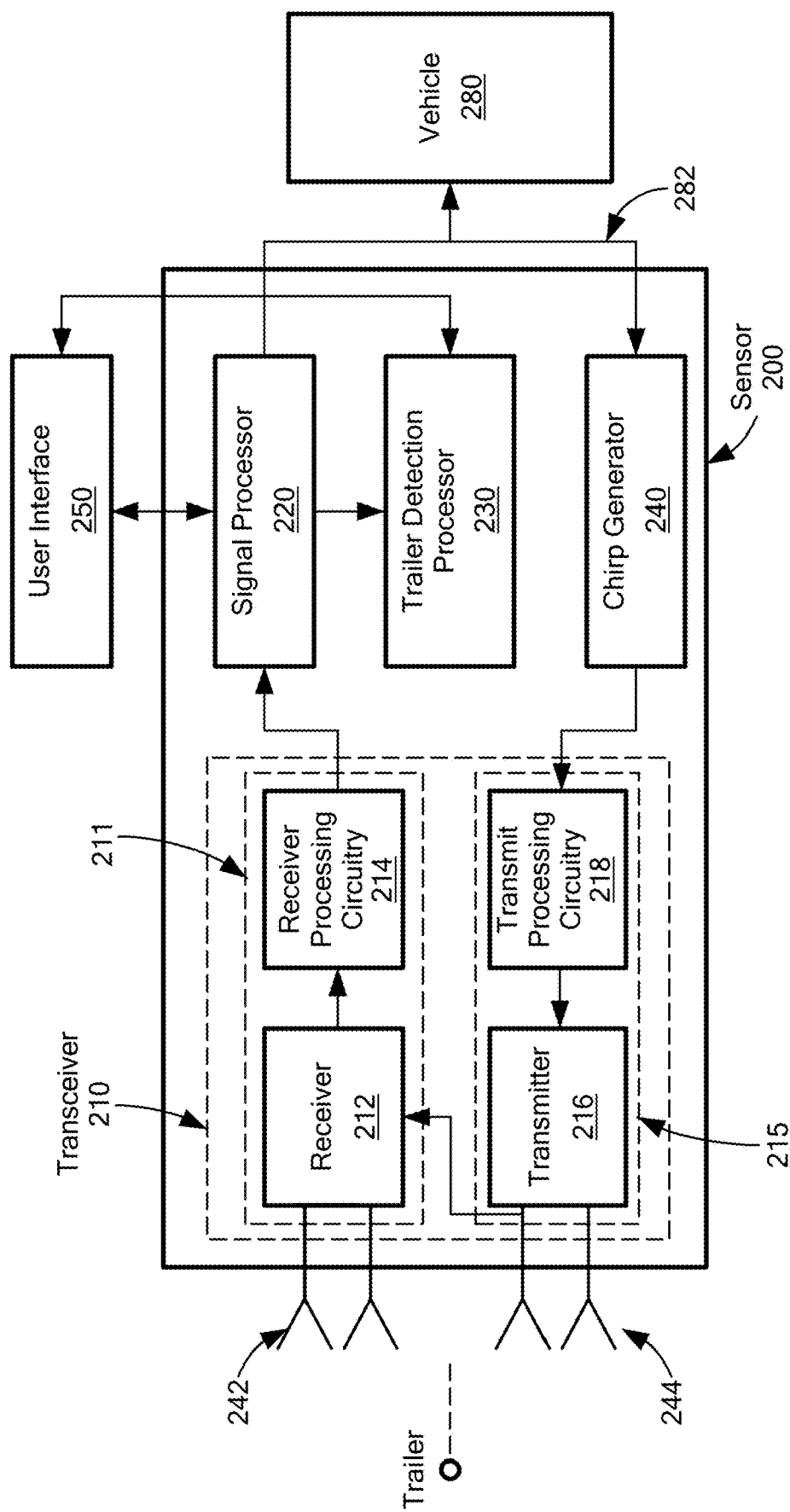
FIG. 2 is a block diagram of an illustrative vehicle radar system capable of determining whether a trailer is coupled to a vehicle.

Referring now to FIG. 2, an illustrative vehicle radar sensor 200 (which may be the same as or similar to the radar portions included in sensors 104a, 104b described above in conjunction with FIG. 1) includes a transceiver 210 having a receive signal path 211 and a transmit signal path 215.

Receive signal path 211 may include a radio frequency (RF) receiver 212 which receives a portion of the RF transmit signal (e.g., as coupled from the transmit signal path as is generally known) as well as RF return signals received via one or more receive antennas 242 at an input thereof. Each of the one or more receive antennas 242 (each of which may comprise a single antenna element or an array of antenna elements). In response to the RF transmit and RF return signals provided thereto, receiver 212 generates an intermediate frequency (IF) signal at an output thereof. Receiver processing circuitry 214 receives IF signals provided at an input thereof, further processes the signals (e.g., by performing some or all of filtering, conditioning, amplifying (or level adjusting) and digitization operations of the IF signals) and provides the signals to a signal processor 220. The receive antennas 242, receiver 212, and receive circuitry 214 thus form a receive signal path which provides signals to a signal processor 220 (e.g., a digital signal processor) In this illustrative embodiment, transmit signal path 215 includes transmit processing circuitry 218 having an input coupled to receive signals from a chirp generator 240 and having an output coupled to an input of a transmitter 216. An output of transmitter 216 is coupled to one or more transmit antennas 244 through which are emitted RF transmit signals. Each of the one or more transmit antennas 244 may comprise a single antenna or an array of antenna elements. The one or more transmit antennas 244, transmitter 216, and transmit processing circuitry 218 thus form transmit signal path 215.

In some embodiments, the transceiver 210 may include more than one receiver and transmitter respectively.

A chirp generator 240 is coupled to the transmitter 216 (and in some embodiments may also be coupled directly to receiver 212) and provides chirp signals thereto. As used herein, the term "chirp" is used to describe a signal having a characteristic (e.g., frequency, amplitude, or any other characteristic or combinations of any characteristics) that varies with time during a time window. The chirp generator enables the sensor 200 to transmit a transmit signal having a chirp waveform and also enables the sensor to receive and process return signals resultant from the transmitted chirp waveform. The chirp generator 240 may also be configured to provide control or other signals to the vehicle 280 and/or receive control or other signals from the vehicle 280 via a signal path 282. In some embodiments, the receiver 212 provides signals characterizing an object within a field of view of the sensor 200 to vehicle 280 via the signal path 282. The signals may include, but are not limited to, a target detection signal when a target is detected or a radar track signal when a track is established for a target. The signals may be coupled to a control unit of vehicle 280 for various uses such as blind spot and rear object detection.

The receiver 212 may include a plurality of receive antennas 242 and can be configured to receive RF signals (e.g., Frequency Modulated Continuous Wave chirp signals). In an embodiment, outputs of receive antennas are coupled to separate receive paths within the receiver 212 and subsequently coupled to inputs of the receiver processing circuitry 214, which may for example process receive signals in digital form. The receiver 212 receives return RF chirp signals from the receive antennas and down-converts the signals to intermediate frequency (IF) signals which are then provided to the receiver processing circuitry 214 and subsequently to other processing portions of vehicle 220. One example of a Frequency Modulated Continuous Wave (FMCW) chirp system is described in U.S. Pat. No. 7,071, 068 assigned to the assignee of the present application and hereby incorporated herein by reference.

The sensor 200 may be coupled to (e.g., communicatively or directly) or be a component of an automotive vehicle 280 for various applications, such as but not limited to, detecting one or more objects, or targets in the field of view of vehicle 280. As will be apparent to those of ordinary skill in the art, the sensor 200 is also suitable for use in many different types of applications including but not limited to any land-based vehicle and/or marine applications in which the sensor 200 can be disposed on a boat, ship or other sea vessel and may also find use in aerial vehicles (including, but not limited to, unmanned aerial vehicles). The sensor 200 is configured to operate at frequencies suitable for applicable operation (e.g., marine, land or airborne operation).

The transceiver 210 may detect one or more targets using radar signals which are generated via chirp generator and provided to an input of the transmit signal path and emitted via transmit antenna 244. Portions of the emitted transmit signal which intercepts objections may be reflected or otherwise re-directed back toward sensor 200 from a target object and are received by receive antenna 242. Receive antenna 242 provides the signals received thereby to an input of receive signal path 211. In this way, receive signal path of transceiver 210 receives reflection signals caused by infrastructure from the radar signals and transfers such reflection signals to signal processor 220. The signal processor 220 is coupled to transceiver 210, and particularly, signal processor 220 may be coupled directly to receiver processing circuitry 214 and receive reflection signals therefrom. In some embodiments, the sensor 200 may comprise a second transceiver (not shown) to receive additional reflection signals and transfer the reflection signals to the signal processor.

The signal processor 220 processes the return signals and provides processed information to a trailer detection processor 230. The trailer detection processor 230 may further process the information provided thereto to determine the existence of a trailer and estimate the dimension of the trailer using a process that will be described at least in conjunction with FIG. 3.

The signal processor 220 may be coupled to a user interface 250. The illustrative block diagram of FIG. 2 shows that the user interface is located separately from the sensor 200. However, as can be appreciated by those of ordinary skill in the pertinent art, the user interface may be provided as part of the sensor 200. In some embodiments, the user interface 250 may be part of the vehicle 280. The signal processor 220 may provide information to the user interface 250, and the user interface 250 may display (or otherwise provide, e.g., via audio signals, mechanical signals or other signals) existence of a trailer and estimated dimension of the trailer. When a risk is detected, such as an object approaches an alert zone based on the estimated dimension of the trailer, the user interface 250 may display or otherwise provide a warning signal (e.g., a visual, audio or mechanical signal) to an operator of the vehicle. The user interface may also display the information on surrounding static infrastructure captured by the signal processor 220 to a user.

FIGS. 3, 6 and 8A-8B are flow diagrams illustrating the processing performed by a sensor (e.g., one of sensors 104a, 104b, 200 in FIGS. 1 and 2) to detect a trailer. The rectangular elements (typified by element 310 in FIG. 3), herein denoted "processing blocks," represent computer software instructions or groups of instructions. The diamond shaped elements (typified by element 630 in FIG. 6), herein denoted "decision blocks," represent computer software instructions or groups of instructions which affect the execution of the computer software instructions represented by the processing blocks. The flow diagram does not depict the syntax of any particular programming language. Rather, the flow diagram illustrates the functional information one skilled in the art requires to generate computer software to perform the processing required of sensor 200 (and/or sensors 104a, 104b and 700). It should be noted that many routine program elements, such as initialization of loops and variables and the use of temporary variables are not shown. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

Figure 3:
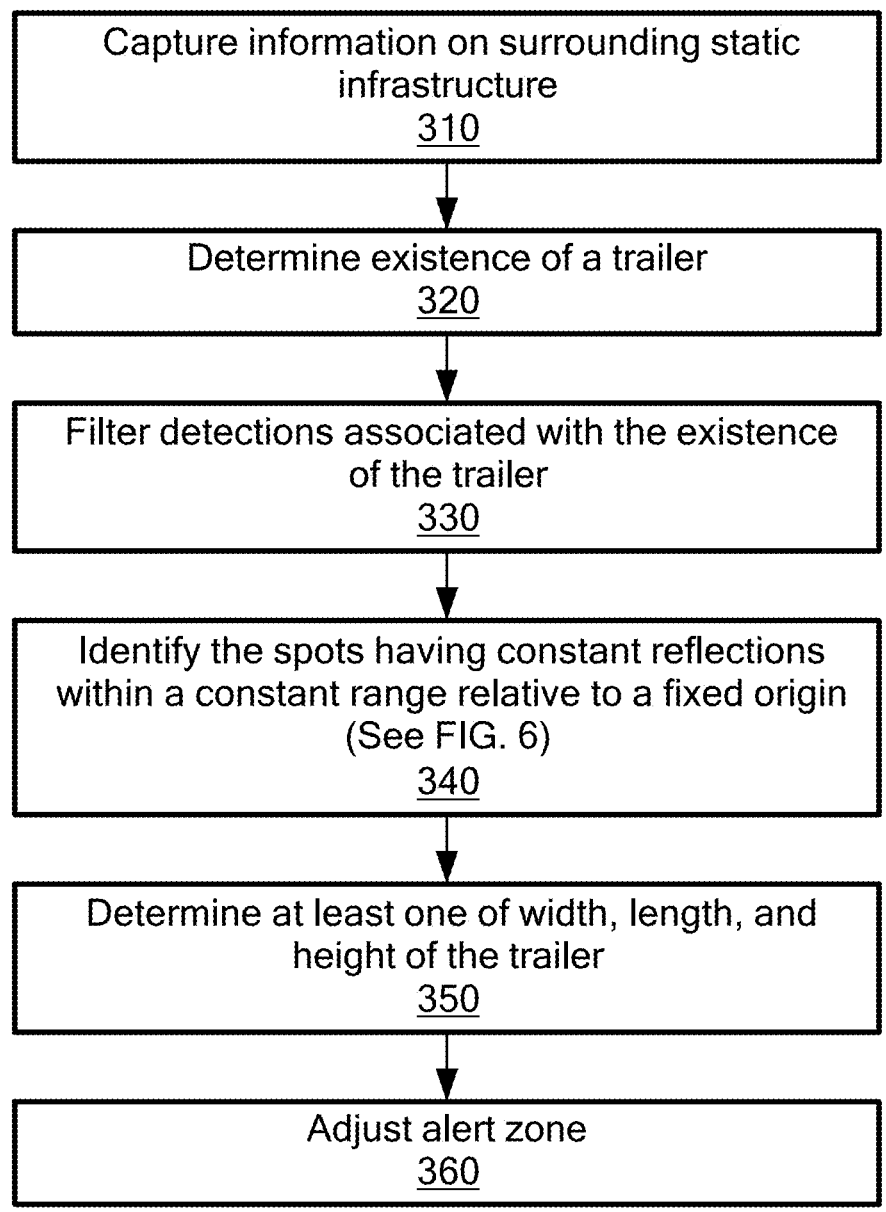
FIG. 3 is a flowchart of a process for detecting a trailer coupled to a vehicle.
Figure 3A:
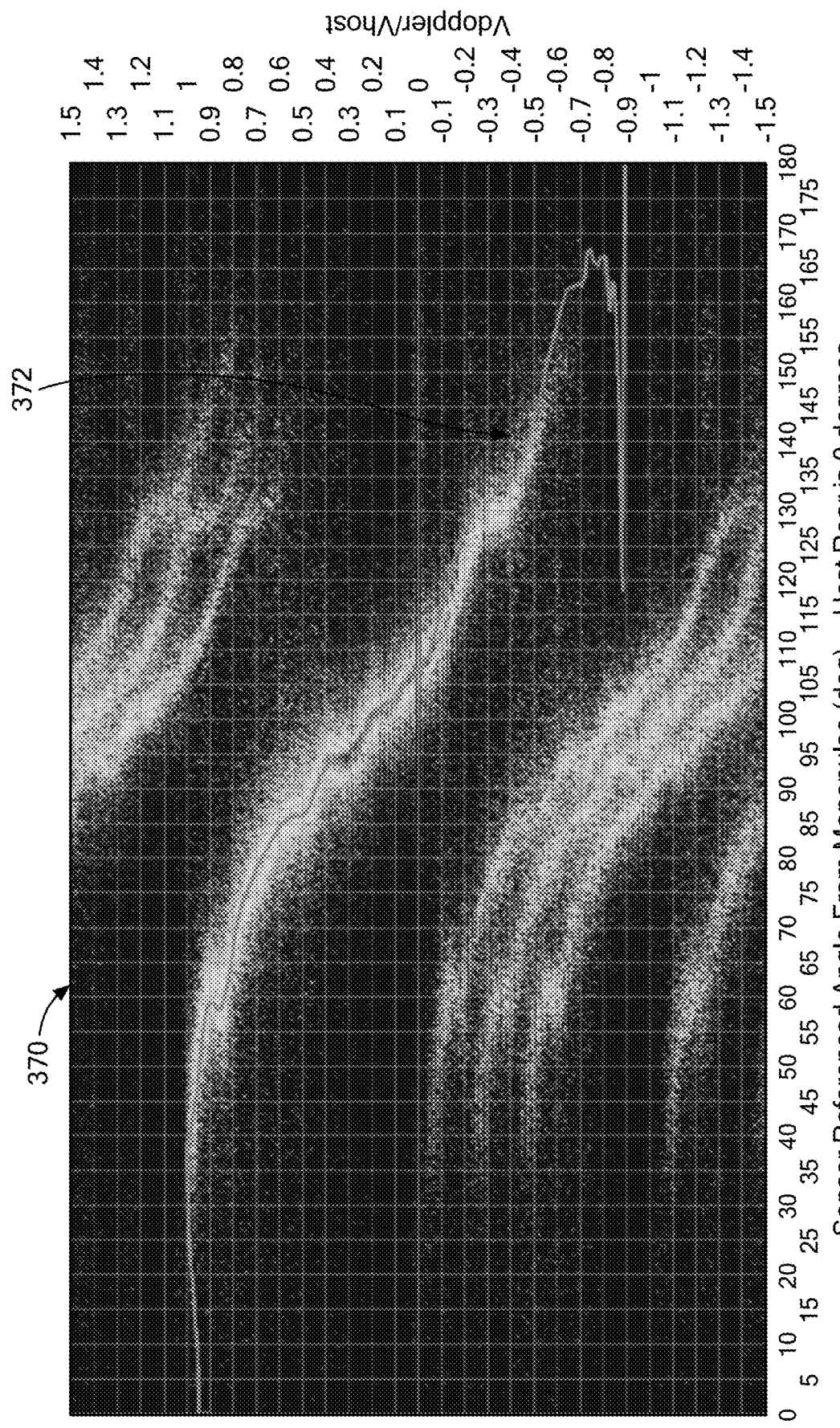
FIG. 3A is an illustrative Doppler Monopulse Image showing a pattern of clutter ridge.

Referring now to FIG. 3, processing begins in processing block 310 in which a sensor (e.g., one of sensors 100, 204a, 204b in FIGS. 1-2) captures information on surrounding static infrastructure. In embodiments, a signal processor (e.g., 220 in FIG. 2) may receive reflection signals from a transceiver (e.g., 210 in FIG. 2) of the sensor. The infrastructure may include the ground, street signs, buildings, and other static elements surrounding a subject vehicle (e.g., 102 in FIG. 1).

In processing block 320, the information on the surrounding static infrastructure is analyzed to determine the existence of a trailer. In embodiments, a trailer detection processor (e.g., 230 in FIG. 2) may determine the existence of the trailer based upon by detecting return signals resultant from reflection of the transmitted RF signals from the stationary infrastructure within the region of interest (as will be explained further below in conjunction with at least FIG. 4A).

When a trailer (e.g., 120 in FIG. 1) is attached to the subject vehicle, reflection signals produced by the trailer may be mixed with other signals which correspond to clutter signals. The return signals from the surrounding static infrastructure captured by a moving radar system (such as a moving vehicle), may form a pattern in Doppler space which is called a "clutter ridge" (e.g., clutter ridge 372 in Doppler Monopulse Image (DMI) 370 of FIG. 3A). In embodiments, the trailer detection processor 230 may use the clutter ridge to determine whether a trailer is present at the rear of the vehicle within the FoV of any associated radar sensors (e.g., one or both of radar sensors 104a, 104b in FIG. 1).

In embodiments, the ASC analysis integrates Fast Fourier Transform (FFT) data directly into a Doppler vs. monopulse angle image space, or Doppler Monopulse Image (DMI). Here, the Doppler is normalized Doppler by dividing the radial range rate by the speed of the host vehicle, as reported over vehicle Controlled Area Network (CAN). The DMI shows a result pattern in the image, which represents is a mapping of the surrounding static infrastructure known as the clutter ridge.

A process for performing ASC analysis will be described in detail below in conjunction with FIGS. 8A and 8B. As a result of the ASC analysis, an image of the surrounding static infrastructure (i.e., the clutter ridge image) may be generated. When the surrounding static infrastructure is easily seen by the radar without any obstacles, the clutter ridge will not be degraded due to the blocking trailer. In contrast, if the surrounding infrastructure is difficult for the radar to see or completely blocked due to an obstacle such as a trailer 120, the image data will appear smeared and attenuated (i.e., the radar sensor detections which form the trailer-caused clutter ridge are spread apart and degraded). Accordingly, by applying ASC quality transitions, it is possible to determine whether a trailer 120 is present and attached to the subject vehicle 102.

In processing block 330, once it is determined that a trailer 120 exists, the trailer detection processor 230 may filter detections that are not associated with the existence of the trailer 120. In embodiments, beam, range and azimuth are considered only for the expected region of a trailer. For example, if the trailer detection processor 230 knows that there is a trailer attached, the trailer detection processor 230 may filter out detections beyond an expected region of the trailer. In one embodiment, a predetermined range may be determined that is greater than the expected length of a trailer. For example, if the end of a trailer is expected to be less than 10 meters from the rear of the vehicle (e.g., less than 10 meters from the rear bumper of the vehicle), then detections which are beyond 10 meters (e.g., 10 meters or more) from the rear end of the vehicle may be filtered out (i.e., ignored or not considered) as the expectation is that a trailer will be less than 10 meters long. This 10-meter distance may be established to setting a range gate of the sensor. Other distances, may of course, also be used based on an expected trailer length.

It should be noted that the range gate is initially applied (i.e., applied up front in the detection process) without any knowledge of the trailer and thus it must be greater than the expected length of the trailer (with margin). The other gate for filtering detections is an azimuth gate, in order to get a full 2D region of interest. The processing then can focus its search for zero relative velocity detections within this region. Nothing behind a host other than portions of a trailer will have exactly zero relative speed once the host is driving within that region for an extended length of time.

In terms of azimuth, the trailer detection processor 230 may filter out detections using an azimuth gate that is the elevation at which signals are expected to be reflected from the trailer. Accordingly, the trailer detection processor 230 may focus its search for zero relative velocity detections within the predetermined range of length and azimuth. Accordingly, trailer detection processor 230 does not consider detections above where the estimated region of the trailer exists (as noted above, nothing behind a host will have exactly zero relative speed once the host is driving within that region for an extended length of time—e.g., more than several seconds).

In embodiments, the trailer detection processor 230 may also consider only reflections having zero or close to zero Doppler. Since the trailer is attached to the subject vehicle 102 and moves at the same or substantially same speed, reflections from the trailer will have zero or close-to-zero Doppler. In embodiments, the trailer detection processor 230 may filter out detections with a Doppler effect smaller than a predetermined Doppler threshold.

In processing block 340, the trailer detection processor 230 may identify one or more trailer regions (e.g., trailer corners 126a-126d in FIG. 1) which provide repeated reflections with a consistent or substantially constant (or ideally constant) range relative to a fixed origin. For example, for a radar sensor operating at a transmit frequency of 24 GHz signal having an RF effective bandwidth of 186 MHz on receive, the size of a range bin is about 186 mm. For a radar sensor operating at a transmit frequency of 79 GHz signal having a bandwidth roughly four (4) times the bandwidth at 24 GHz, the size of a range bin is about one fourth (¼) of the range bin of 24 GHz radar sensor or 47 mm. Sub-bin accuracy may be achieved in this case, due to the increased signal to noise ratio associated with the integration process of the range histogram, which expects on the order of 10 mm of sub-bin accuracy. The sensitivity of the systems relying on such accuracy makes the algorithm substantially sensitive to minor changes in range during a turn. Accordingly, those minor changes may be filtered out of the process for determining integrated constant range peaks. As can be appreciated by a person in the pertinent art, narrower range bin such as 10 mm of integrated accuracy may be used to achieve better sub-bin performance. This range bin may be used to determine a constant range. That is, in the illustrative embodiment, it may be determined to have a constant range when the reflections are in a range of 10 mm. In embodiments, the trailer 120 is attached to the subject vehicle 102 using a hitch (e.g., 118 in FIG. 1). The trailer 120 may move to left and right but will maintain the same distance relative to the point (or a fixed origin) where the hitch 118 is attached to the vehicle 102. Accordingly, reflections of radar signals from physical points on the trailer will generate return signals indicating a consistent distance or even the same distance or substantially the same distance from the fixed origin (i.e. the reflections will stay in a consistent or substantially constant range from the fixed origin). In other words, regions having repeated reflections within a consistent or substantially constant range relative to the fixed origin may be identified by the sensor. Some of the regions may correspond to reflections having an amplitude that is equal to or greater than a predetermined threshold. The threshold is based on a noise floor estimate of the FFT bins within the surrounding Range-Doppler space. In some embodiments, the regions having stronger amplitude than the predetermined threshold may be referred to as "bright regions." For example, the four corners 126a-126d of the trailer 120 may correspond to bright regions on the trailer.

In processing block 350, the trailer detection processor 230 may estimate the dimension of the trailer 120 based upon the identified "bright" regions of the trailer. That is, the trailer detection processor 230 may determine at least one of width, length, and height of the trailer based on the bright regions. In embodiments, the repeated reflections from the bright regions form a group of detections. For example, reflections from the right front corner of a trailer (e.g., a corner 126a in FIG. 1) forms a group of detections. In embodiments, the trailer detection processor 230 may choose a location where the most frequent reflections are measured as the point corresponding to the front right corner of the trailer 120. Alternately, the trailer detection processor 230 may select a group of reflections that are supposed to be produced by the front right corner and calculate a center spot among the distributed reflections. As can be appreciated by those of ordinary skill in the pertinent art, other suitable methods may be used to determine a spot corresponding to each corner of the trailer 120. Based upon the determined corners, the trailer detection processor 230 may estimate the dimension of the trailer 120.

In embodiments, the processing/activities performed in processing block 350 may be done in parallel to the processing block 340, or the processing/activities in processing block 350 may be a subset of the processing block 340. All processing/activities after processing block 330 look for trailer features to define the dimensions, while the activities in processing block 340 may be performed when the subject vehicle 102 makes a turn.

In embodiments, a radar system, for example a radar system using 24 GHz signal, may send/receive signals that may be used to estimate the width and length of the trailer.

In other embodiments, a radar system, for example a radar system using 79 GHz signal, may be able to discriminate elevation of signals such that the radar system may estimate a height of the trailer.

In embodiments, using filtered detections directly and collapsing data about reflections associated with the filtered detections into any one of 3 dimensions (X, Y, and Range) may generate three one-dimensional (D) data arrays at each major cycle of the radar. In embodiments, the sensor may have so-called "minor cycles" and so-called "major cycles." One example of minor and major cycles is described in connection with U.S. Pat. Nos. 6,683,557, 6,816,107 and 6,977,609 all of which are assigned to the assignee of the present application and hereby incorporated herein by reference their entireties.

The three one-dimensional (1D) data arrays may be used to update three corresponding histograms. In some embodiments, the range and azimuth value are converted to X/Y coordinate values using known coordinate transformation techniques and the X/Y values are "collapsed" into two 1D line spaces used to update X and Y histograms. That is, the X/Y values are stripped of any other information. The X/Y dimension information is used to attain true 1D statistics such that, if the dimension is X, the data is mapped based on its X value. Thus, when the subject vehicle 102 turns, radial range referenced to the fixed origin is used to directly update a range histogram.

Based upon the three histograms (X, Y, Range), a peak-finding process may determine "bright" regions of the trailer 120. The "bright" regions are regions of a target object are regions corresponding to repeated reflections having an amplitude equal to or greater than a predetermined amplitude threshold with a consistent or constant or substantially constant range relative to a fixed origin on the trailer. Such regions may be generated as a result of (and correspond to), for example, corners of the trailer, wheel wells or other location where a trailer structure (e.g., a frame) creates large corner reflectors easily detected by the radar since such large reflectors generate return signals having an amplitude which is relatively large compared with the amplitude of return signals due to reflections from other portions of the trailer. These bright regions are used to define a box that corresponds to the outer outline of the trailer.

In processing block 360, the trailer detection processor 230 may adjust an alert zone based upon the determined width, length, and height of the trailer in order to prevent false alarms from the presence of the trailer In embodiments, after all detections are processed, the physical field of view of the sensor remains unchanged, but the region determined to be occupied by a trailer will influence the alert logic (or some other post-processing algorithm/technique) which would determine how to handle the detection or tracked object in the region that is determined to be occupied by a trailer.

For example, if a vehicle 102 towing a trailer is equipped with a sensor system (such as one of the sensor systems described hereinabove in conjunction with FIGS. 1 and 2) which provides an alert signal (or an alarm) in response to approaching objects (such as another vehicle), the system may generate an alert signal in response to detecting the attached trailer. Thus, under this scenario, the alert signal would correspond to a false alarm signal.

The chances of a sensor generating such a false alarm signal are particularly true when the vehicle 102 makes turns. That is, the vehicle 102 may consider the attached trailer as another vehicle approaching the subject vehicle, and may generate an alert signal corresponding to a false alarm signal. In embodiments, in order to prevent the false alarms, an alert zone for the vehicle may be adjusted based upon the estimated dimension of the trailer.

In some embodiments, the alert zone may be adjusted such that an alert signal is only generated when an object is close to the trailer and is approaching the trailer. For example, if it is determined that the width of the trailer is 6 feet, 8 feet of the alert zone may be set behind the subject vehicle 102, such that the sensor 200 generates an alarm if an object is detected in the adjusted alert zone. In other embodiments, the estimated dimension of the trailer may be used to assist other algorithms that require the extent of the trailer (i.e., width, length, and/or height).

Figure 4A:
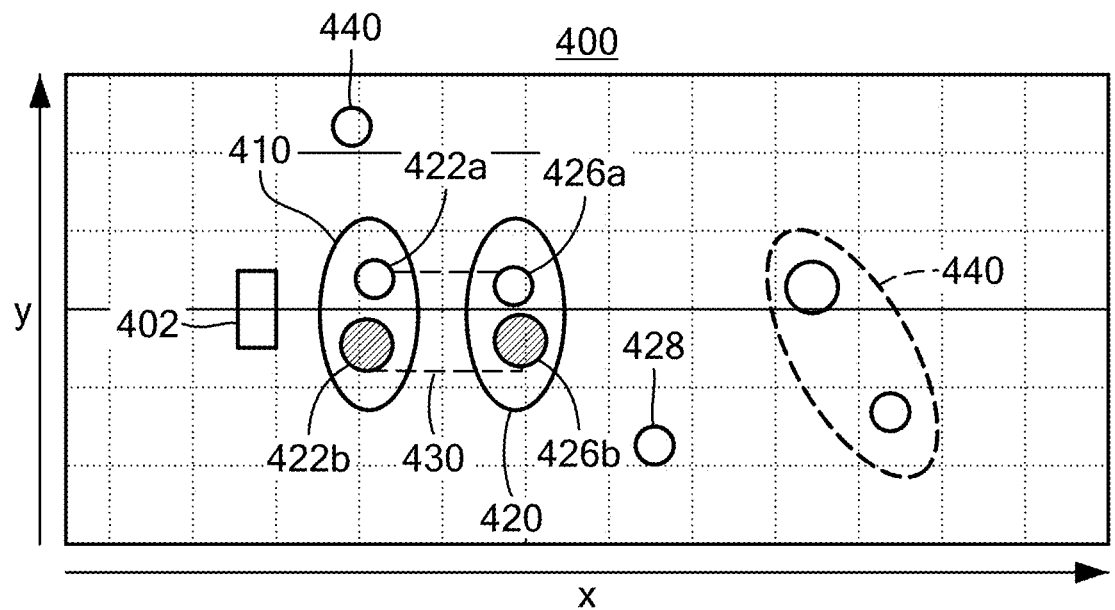
FIG. 4A is a diagram representing results of a trailer detection cycle.

Referring now FIG. 4A, a diagram 400 illustrating the locations of detections from a trailer includes a plurality of groups of detections 410, 420, 428, 432, 440 resultant from signals reflected from a trailer (e.g., trailer 120 in FIG. 1) and other surrounding infrastructure and detected by a radar sensor (such as one of the radar sensors described above in conjunction with FIGS. 1 and 2).

In this example, the groups of returns 422a, 422b, 426a, 426b, 428 correspond to regions of repeated reflections (i.e. repeated return signals having an amplitude equal to or greater than a threshold value (i.e., the return signals have amplitudes above the threshold value). The threshold value may be pre-defined, user-selected, or determined by the sensor itself. In embodiments, the threshold may be determined dynamically as a relative value which is normalized to the peak energy in the histogram. In other embodiments, the threshold may be determined based upon a percentage of the way between the peak energy to the background energy. These schemes are very similar to taking an average value and providing an offset from this level. Accordingly, the threshold is not a predetermined value and can adapt to any environment, since certain trailer types may provide higher peaks than others.

The groups 422a, 426a 428, 432 with a lighter color are from radar signals from a sensor on the right side of a vehicle (e.g., sensor 104a in FIG. 1). The groups 422b, 426b, 429 with a darker color are from radar signals from a sensor on the left side of a vehicle ((e.g., sensor 104b in FIG. 1). Particularly, the groups 422a, 422b directly behind vehicle 402 may indicate a location of a front side 410 of a trailer. The groups 422a, 422b having repeated signal reflections with an amplitude equal to or greater than a threshold may correspond to the front corners of a trailer (e.g., portions 126a, 126b of trailer 120 in FIG. 1).

The groups 426a, 426b in a rear detection area 420 may correspond to the rear corners (e.g., portions 126c, 126d of trailer 120 in FIG. 1). From these detections, the system may be able to determine the size (i.e. the dimensions of) the trailer attached to vehicle 402. In this example, the trailer may have a size illustrated by dotted line 430. In embodiments, single dimensional radial range data may be used to determine the trailer dimensions. Based on information for X (longitudinal) and Y (lateral) distances behind the host, the histograms increase until the peak values exceed a pre-determined threshold. Then these are considered "bright" regions of the trailer that have well-integrated magnitude. The farthest extent of these in X and Y determine the full observable extent of the trailer.

In embodiments, one or more other detection groups (such as detection groups 428, 440) may be identified during the same detection cycle during which detection groups 422a, 422b, 426a, 426b are identified. The reflections associated with the groups 428, 440 may come from infrastructure surrounding the sensor (and surrounding the trailer), such as a street sign, or ground.

It should be noted that another vehicle proximate to and moving at substantially the same speed as the subject vehicle 402 may also cause the detection group 428 or 440. As described in conjunction with processing block 330 in FIG. 3, the detection group 428, 440 may be filtered out because the physical location of these regions is beyond the estimated region of the trailer. Additionally, these detection groups caused by other surrounding infrastructure are not likely detected again in the following detection cycles since they will not be generated due to reflected signals have a consistent or constant (or substantially constant) amplitude which exceeds the threshold and which occur at a consistent or constant (or substantially constant) range. This is in contrast to reflections from a trailer which will have a consistent or constant (or substantially constant) amplitude which exceeds the threshold and which occur at a consistent or constant (or substantially constant) range. Accordingly, after multiple detection cycles, detection groups caused by surrounding infrastructure other than the trailer will be filtered out, which enables correct estimation of the size of the trailer.

As noted in FIG. 4A, the regions 422a, 422b, 426a, 426b correspond to locations at which reflections at a consistent or constant or substantially constant range and having a consistent or constant or substantially constant amplitude above a threshold amplitude (i.e., so-called "strong reflections") occur.

Figure 4B:
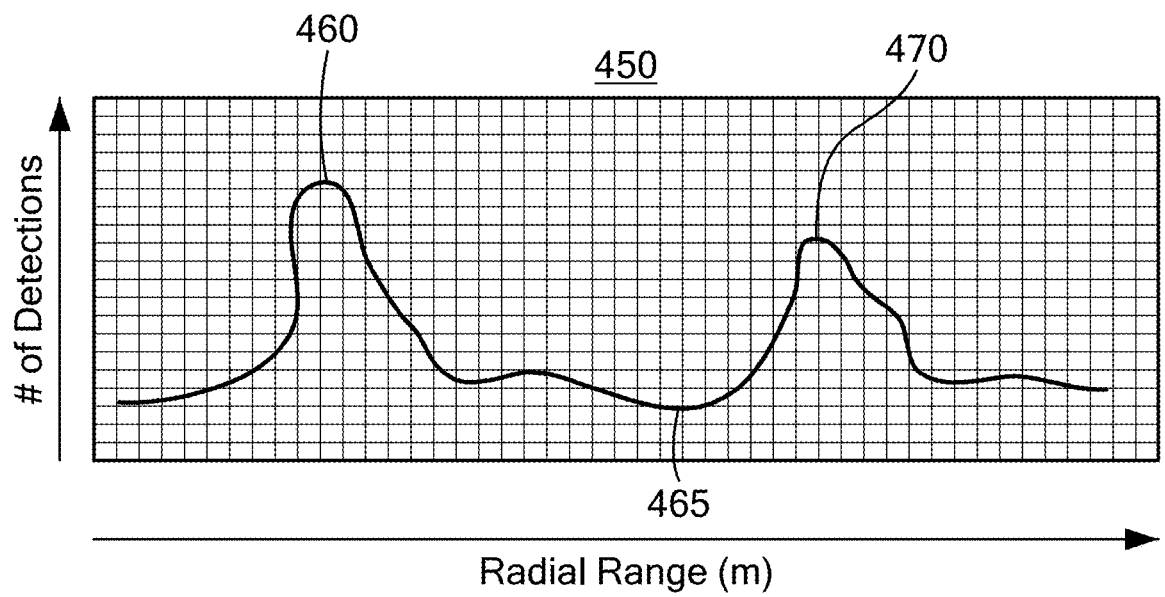
FIG. 4B is a histogram representing results of integrating trailer detections into a histogram according to a trailer detection process which may be the same as or similar to the process described in conjunction with FIG. 3.

In FIG. 4B, regions 422a, 422b, 426a, 426b correspond to peak locations 460, 470 in radial histogram 450. In embodiments, X and Y histograms may also be created by converting range and azimuth values associated with reflections of radar signals into two one-dimensional (1D) line space (i.e., an X-line space and Y-Line space). Here, radial range that is referenced to a connection point 412 of a hitch (e.g., 118 in FIG. 1) is used to update the histogram 450. That is, the connection point 412 of the hitch 118 is used as a fixed origin in a trailer detection process described in FIG. 3. In this example, the bright regions 422a, 422b in the front detection area 410 may correspond a peak location 460 of the histogram 450. The regions 426a, 426b in the rear detection area 420 may also correspond to another peak location 470 of the histogram 450. In contrast, for other regions having non-repeated reflections or reflections having not enough strength may correspond to a non-peak location, for example 465, of the histogram 450.

Referring now to FIGS. 5A-5B, illustrative diagrams showing results of continuous detection cycles are presented. As described in conjunction with FIG. 4A, regions (e.g., 522a, 522b in FIG. 5B) formed from repeated reflections having an amplitude equal to or greater than a threshold may be detected in a detection cycle. As the detection cycles are repeated, more detections can be made and some of the detections may form a group indicating a spot on a trailer. FIGS. 5A-5B present a graphical representation of the results from the detection cycles. Referring to FIG. 5A, when there is no trailer is attached to the subject vehicle 502, sensors 504a, 504b may see the surrounding infrastructure clearly since the infrastructure is not blocked by the trailer.

Accordingly, detections generally denoted 514, are randomly distributed in a region begin a vehicle 502 and sensor 504a, 504b, coupled to vehicle 502 (and particularly a trailer detection processor (such as trailer detection processor 230 in FIG. 2) included in such a sensor) may determine that there is no trailer attached to the vehicle 502.

Referring to FIG. 5B, when a trailer (e.g., trailer 120 in FIG. 1) is attached to the vehicle 502, regions corresponding to repeated reflections may be detected. In embodiments, radar signals from a sensor 504a may be reflected constantly by a corner (e.g., trailer corner 126a in FIG. 1) of the trailer 120. Since the trailer is attached to the vehicle 502 by a hitch (e.g., 118 in FIG. 1), the distance from the connection point (e.g., 112 in FIG. 1) of the hitch to the corner 126a will remain substantially the same. That is, repeated (or consistent or constant or substantially constant reflections caused by the corner 126a will be in a consistent or constant or substantially constant range relative to a fixed origin 512 (i.e., the connection point 112 of the hitch 118). Accordingly, the reflections of radar signals from a right sensor 504a caused by the corner 126a will form a group 522a.

Similarly, reflections of radar signals of a left sensor 504b caused by another frontside corner (e.g., 126b in FIG. 1) may form another grouping 522b of repeated reflections with an amplitude equal to or greater than a threshold. Accordingly, the trailer detection processor 230 may estimate the locations of the frontside corners of the trailer based upon the groupings 522a, 522b of repeated reflections, and also may estimate a width of the trailer.

In embodiments, there may be groupings 524a, 524b of reflections that are corresponding to wheel wells of the trailer. Reflections caused by the rear end (e.g., 126c, 126d) of the trailer may also form groupings 526a, 526b. Based upon the groupings 522a, 522b, 524a, 524b, 526a, 526b of reflections, the trailer detection processor may estimate the size of the trailer 520. In some embodiments, a radar sensor that has elevation capability, such as a radar sensor operating at a frequency of 79 GHz (i.e. operating with transmit signals having a frequency of 79 GHz), the trailer detection processor 230 may estimate the height of the trailer. This may be accomplished by calibrating the phase difference between two or more receive channels in the vertical plane of the array of receive elements. The measured phase difference between vertical receive elements will correspond to an angle of arrival in the elevation plane, which can be used to estimate the height of a trailer. There may be other regions with a strong amplitude, for example group 528. In contrast with groups 522a, 522b, 524a, 524b, 526a, 526b where clear grouping is shown, the other regions spread (i.e. are not focused within a particular area and do not form groupings). These detections will be filtered out, as described in conjunction with FIG. 3.

Figure 6A:
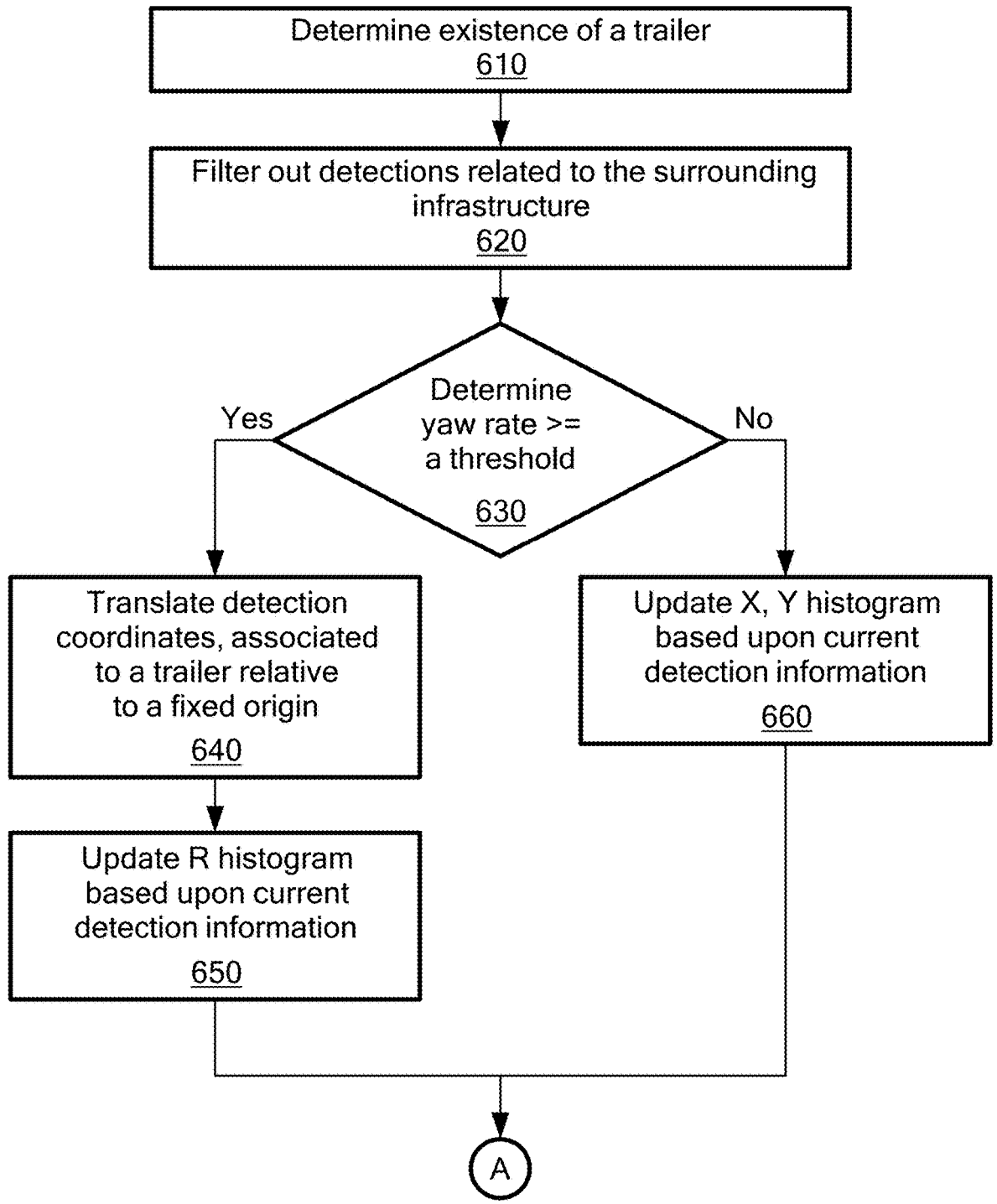
FIGS. 6A-6B are flowcharts of a process for estimating the dimension of a trailer.
Figure 6B:
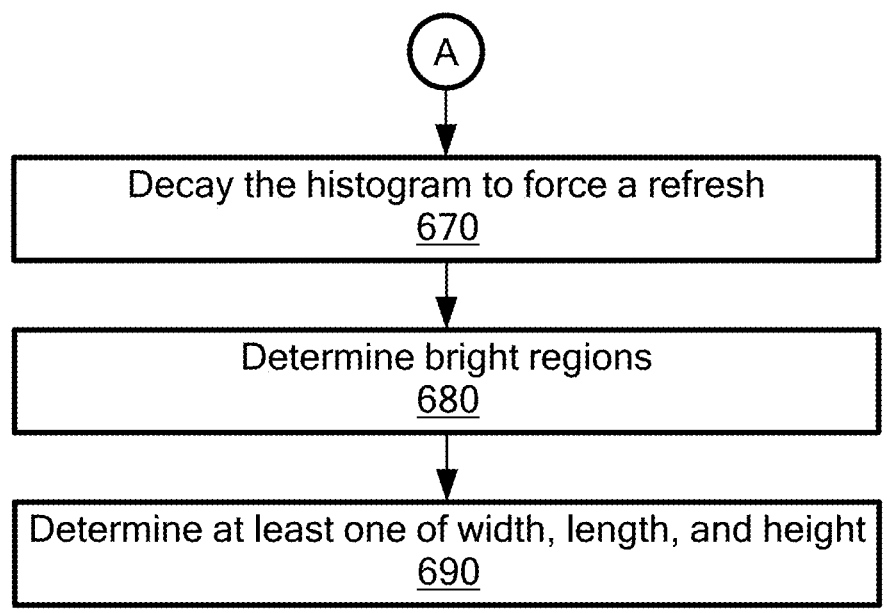

Referring now to FIGS. 6A-6B, shown is a process for identifying one or more locations (or regions) on a trailer which produce repeated reflections having a substantially constant amplitude equal to or greater than a predetermined amplitude threshold at a substantially constant range relative to a fixed origin.

Referring to FIG. 6A, in processing block 610 (which may be the same as or similar to the operations in processing block 320 described above), a sensor (e.g., 104a, 104b in FIG. 1) may determine the existence of a trailer. This may be accomplished, for example, using an ASC quality analysis.

In processing block 620 (which may be the same as or similar to the operations in processing block 330 described above), detections related to surrounding infrastructure other than the trailer are filtered out. In embodiments, detections beyond the region of interest (i.e., a region in which a trailer may exist) may be filtered or otherwise omitted from consideration. In embodiments, detections with non-zero Doppler are filtered out. Since the trailer is attached to a subject vehicle (e.g., 102 in FIG. 1) and moves at substantially the same speed, detections associated with the trailer will have a very small to zero Doppler return.

Processing then proceeds to a subprocess (processing blocks 630-690) for identifying regions corresponding to repeated reflections having an amplitude equal to or greater than a predetermined amplitude threshold with a substantially constant range relative to a fixed origin. In decision block 630, it is determined whether a yaw rate associated with a detection exceeds a threshold. The yaw rate is angular velocity of a yaw rotation, which is a movement around of a yaw axis of an object that changes the direction that the object is pointing to. Here, the yaw rate indicates how much a direction of the trailer (e.g., 120 in FIG. 1) moves relative to a fixed origin (e.g., a connection point of a trailer hitch 112 as illustrated in FIG. 1). A threshold may be defined such that, if the yaw rate is smaller than the threshold, it means that the subject vehicle 102 moves straight and the trailer 120 does not make a turn. In embodiments, the yaw rate threshold is selected such that at the threshold, the visibility along the side of the trailer becomes significant enough to recognize the integrated energy at various points between the front and rear locations of the trailer. For example, the threshold can be about five (5) deg./sec.

If it is determined that the yaw rate is equal to or greater than a threshold, meaning that the trailer makes a turn above a certain degree, then processing proceeds to processing block 640, in which coordinates values of the detections associated with the trailer are translated or mapped relative to the fixed origin. Herein, the connection point (e.g., 118 in FIG. 1) is referenced as a fixed origin. In processing block 650, a radial range histogram (e.g., as shown in FIG. 4B) is updated based on the current detection information. When the subject vehicle makes a turn, the detections become significant, especially when both left and right sensor results are combined.

If, in decision block 630, it is determined that the yaw rate is smaller than a threshold (i.e., the vehicle does not make a turn), then processing proceeds to in processing block 660, in which at least one of X and Y histograms is updated. In embodiments, the X and Y data are derived from range and azimuth such that the X/Y data does not require turning. Accordingly, the X/Y data is calculated during the straight path trajectories, while the range diagram is updated when the vehicle makes turns. The difference is critical because constant range energy (relative to the fixed origin) from a trailer, during a turn, can be easily recognizable compared with detections from any other reflectors in the sensor's field of view. Processing proceeds then to processing block 670, in which the histograms are decayed to force a refresh with the diagrams. In embodiments, the level across the entire histogram is reduced to force the histogram to retain only the last several minutes of data, as previous data will eventually be decayed away. In embodiments, constantly refreshing the histograms may allow the algorithm to be more robust and adapt to changing environments. In processing block 680, brightest regions (e.g., 522a, 522b in FIG. 5) corresponding to repeated reflections with a substantially constant range relative to a fixed origin are determined based upon the detections. In processing block 690, based upon the determined brightest regions, at least one of range, width, length and height of the trailer is determined.

It should be noted that, when a vehicle makes turns, only a radial range histogram is updated. If the vehicle moves straight, only the X and Y histograms are updated. Updating the radial range diagram and X/Y histograms are two separate processes that do not happen at the same time. The processing block 650 integrates only the range information translated to a fixed origin at the hitch. This range information translated to a fixed origin is significant during turns, especially when both left and right sensor results are combined. The X and Y data that are derived from range and azimuth (as explained above) do not require vehicle turning, which is why the X/Y data are calculated during the straight path trajectories. It needs to be noted that that constant range energy (relative to the hitch) from a trailer, during vehicle turns, is completely unambiguous (i.e., easily distinguishable) with detections from any other reflectors (i.e., surrounding infrastructure) in the sensor's field of view.

Figure 7:
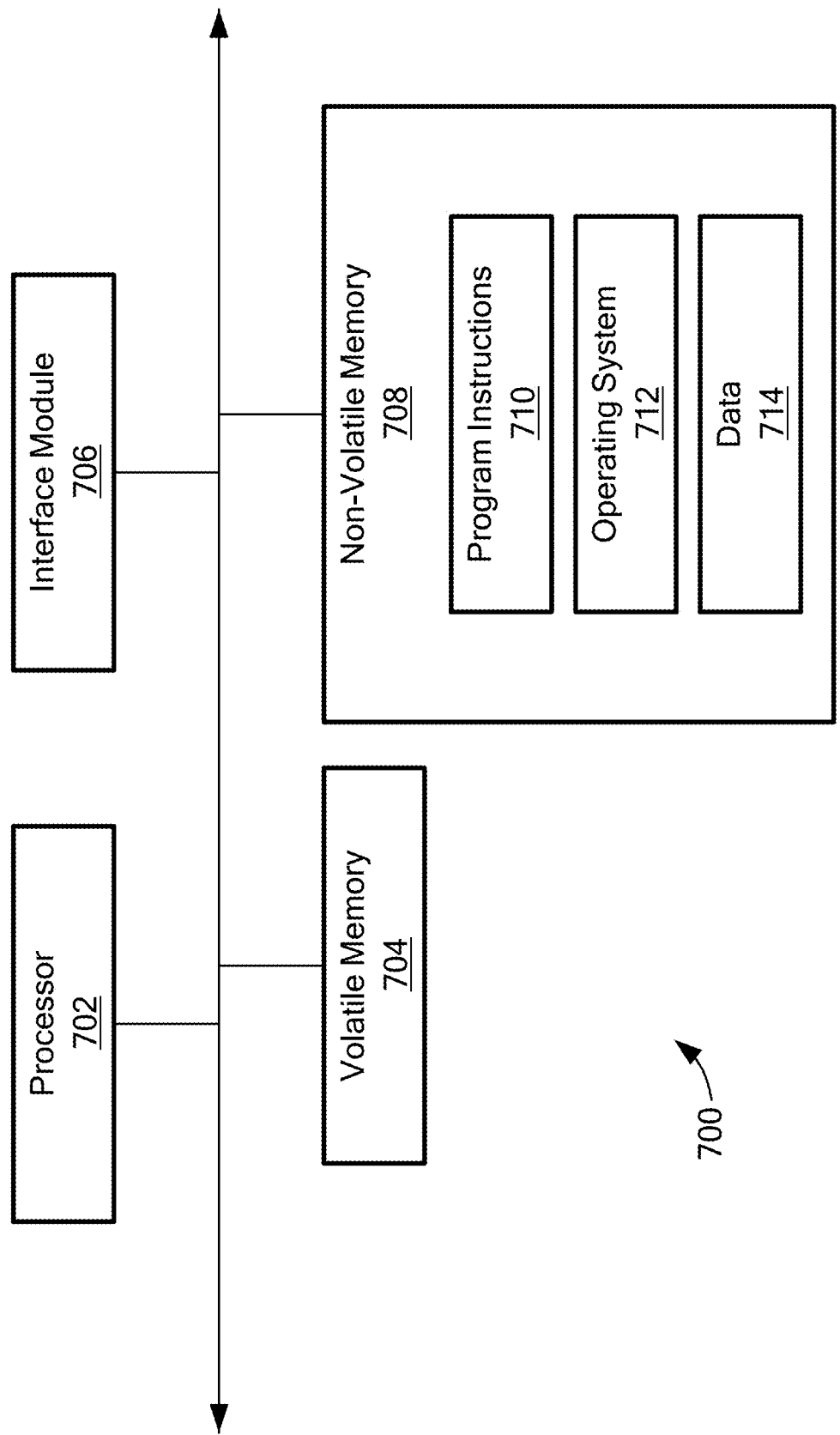
FIG. 7 is a block diagram of an illustrative implementation of a processor capable of performing the vehicle radar system processes described in conjunction with FIGS. 1-6.

Referring now to FIG. 7, an illustrative implementation of a processing device 700 which may be suitable to implement the processing techniques (e.g., process 300 in FIG. 3) described herein includes a processor 702, a volatile memory 704, a non-volatile memory 708 (e.g., hard disk) and the interface module 708 (e.g., a user interface, USB interface and so forth). The non-volatile memory 708 stores computer instructions 710, an operating system 712 and data 714. In one example, the computer instructions 710 are executed by the processor 702 out of volatile memory 704 to perform all or part of the processes described herein (e.g., process 300).

The processes described herein (e.g., processes 300, 600) is not limited to use with hardware and software of FIG. 2 or FIG. 7; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or another article of manufacture that is readable by the processor (including volatile and non-volatile memory and/or storage elements), at least one input device, and one or more output devices. The program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high level procedural or object-oriented programming language to work with the rest of the computer-based system. However, the programs may be implemented in assembly, machine language, or Hardware Description Language. The language may be a compiled or an interpreted language, and it may be deployed in any form, including as a stand-alone program or as a module, component, subroutine, or another unit suitable for use in a computing environment. A computer program may be deployed to be executed on one computer or multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

Figure 8:
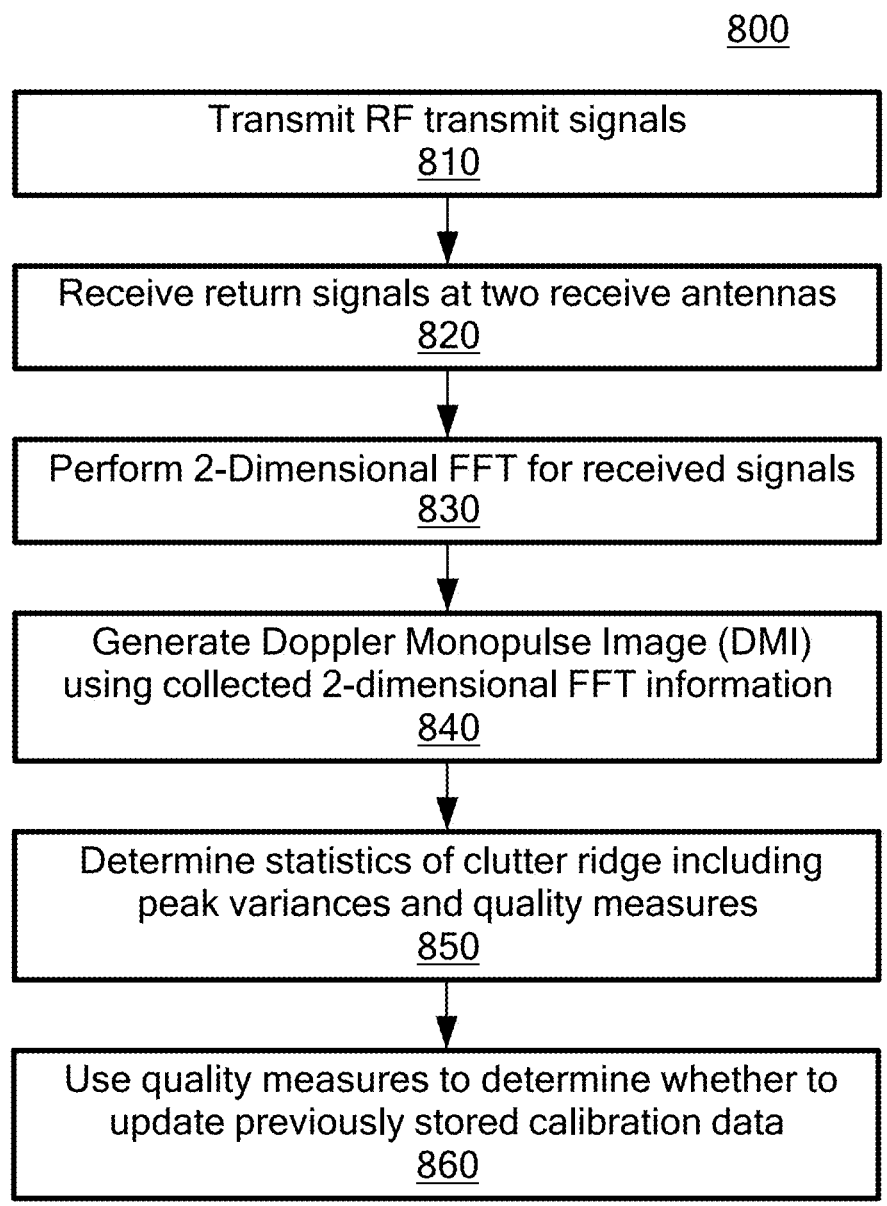
FIG. 8 is a flowchart of a process for Angle Self Calibration (ASC) quality analysis.

Referring now to FIG. 8A, Radio Frequency (RF) transmit signals may be transmitted into a region of interest about a vehicle that includes stationary infrastructure (in processing block 810). The RF transmit signals may be transmitted when, for example, the vehicle is moving at a speed within a predetermined range (e.g., greater than 10 kph in one implementation). The RF transmit signals may include, for example, a series of chirp signals or any other type of signal that is capable of acquiring relevant infrastructure information from the region of interest. Return signals are received at two (or more) receive antennas of the sensor (block 820). The return signals result from reflection of the transmitted RF signals from the stationary infrastructure within the region of interest.

A 2-dimensional FFT is performed for each of two (or more) receive channels (block 830). The received signals may be downconverted, filtered, and digitized before the 2-dimensional FFT is applied. Digital downconversion may be used in some implementations. Information associated with the 2-dimensional FFT (i.e., range-Doppler bin information) is then used to develop a Doppler Monopulse Image (DMI) (block 840). The phases of the range-Doppler bins of the 2-dimensional FFTs may be used to generate information for the x-axis of the DMI (e.g., phase difference values or monopulse angle values). The Doppler values of the bins, and knowledge of the speed of the vehicle of interest, may be used to generate normalized Doppler values (Vr/Vh) for the y-axis of the DMI. Averaging may be used to average the signal strengths of points plotted on the DMI. An Infinite Impulse Response (IIR) filter or the like can be used to perform the averaging. The above-described process of transmitting RF signals, receiving return signals, performing a 2-dimensional FFT, and generating (or updating) the DMI may be performed repeatedly before a useable DMI is formed. In some embodiments, this process may run continuously in the background during sensor operation to update the DMI with IIR filtered information.

Referring now to FIG. 8B, statistics of the clutter ridge of the DMI may also be determined (block 850). The statistics may include, for example, peak variance information, signal quality statistics (e.g., signal strength, SNR, etc.), and/or stability statistics. The quality statistics may be used to determine whether or not to update previously stored angle calibration data with the newly generated data (e.g., update if the quality of the new data is better than the quality of the previous data, etc.) (block 860). Further, the quality statistics may be used to determine the presence of a trailer according to the detection process described in conjunction with FIG. 3. In embodiments, the quality statistics may be used to determine the existence of a trailer as the extent of the trailer in the azimuth dimension alone.

The inventive concepts presented herein may use an existing algorithm of Angle Self Calibration (ASC) quality analysis to detect the presence of a trailer. The ASC analysis may capture surrounding static infrastructure by integrating Fast Fourier Transform (FFT) data into a Doppler vs. monopulse angle image space. Additionally, after detecting the presence of a trailer, at least one of length, width, and height of the trailer can be estimated by detecting bright regions based upon histograms that are generated by converting range and azimuth values of detections.

Having described preferred embodiments, which serve to illustrate various concepts, structures and techniques, which are the subject of this patent, it will now become apparent that other embodiments incorporating these concepts, structures and techniques may be used. Accordingly, it is submitted that the scope of the patent should not be limited to the described embodiments but rather should be limited only by the spirit and scope of the following claims.

Accordingly, other embodiments are within the scope of the following claims.

What is claimed is:

1. A method comprising:
   transmitting signals to and receiving reflection signals from surrounding static infrastructure to capture information on the surrounding static infrastructure;
   determining an existence of a trailer based upon the captured information on the surrounding static infrastructure;
   in response to the existence of the trailer:
      filtering detections associated with the existence of the trailer;
      identifying one or more regions on the trailer based upon the filtered detections, the one or more regions corresponding to repeated reflections having an amplitude equal to or greater than a predetermined amplitude threshold with a substantially constant range relative to a fixed origin, wherein identifying the one or more regions on the trailer further comprises:
         determining a yaw rate associated with the filtered detections;
         in response to the yaw rate greater than or equal to a predetermined yaw rate threshold:
            translating detected coordinates associated with the trailer relative to the fixed origin; and
            updating a range histogram in a radial range based upon the filtered detections;
         in response to the yaw rate smaller than the predetermined yaw rate threshold, updating at least one of X and Y histograms based upon the filtered detections;
         forcing the range histogram, X histogram and/or Y histogram to be refreshed; and
         determining the one or more regions based upon the filtered detections; and
      determining at least one of a width, length, and height of the trailer based on the identified one or more regions.

2. The method of claim 1, wherein the existence of the trailer is determined using Angle Self Calibration (ASC) quality analysis.

3. The method of claim 1, further comprising:
   adjusting alert zone for the vehicle based upon the at least one of width, length, and height of the trailer.

4. The method of claim 1, wherein filtering detections further comprises filtering detections beyond expected dimension of the trailer.

5. The method of claim 1, wherein filtering detections further comprises filtering detections having Doppler effect equal to or greater than a Doppler threshold.

6. A sensor comprising:

a transceiver configured to transmit signals to and receive reflection signals from surrounding static infrastructure; and a signal processor configured to receive the reflection signals from the transceiver, said signal processor configured to:

capture information on the surrounding static infrastructure;

a trailer detection processor configured to receive the captured information from the signal processor, said trailer detection processor configured to:

determine an existence of a trailer based upon the captured information on the surrounding static infrastructure;

in response to the existence of the trailer:

filter detections associated with the existence of the trailer;

identify one or more regions on the trailer based upon the filtered detections, the one or more regions corresponding to repeated reflections having an amplitude equal to or greater than a predetermined amplitude threshold with a substantially constant range relative to a fixed origin, wherein said trailer detection processor is further configured to identify the one or more regions on the trailer by:

determining a yaw rate associated with the filtered detections;

in response to the yaw rate greater than or equal to a predetermined yaw rate threshold:

translating detected coordinates associated with the trailer relative to the fixed origin; and updating a range histogram in a radial range based upon the filtered detections;

in response to the yaw rate smaller than the predetermined yaw rate threshold, updating at least one of X and Y histograms based upon the filtered detections;

forcing the range histogram, X histogram and/or Y histogram to be refreshed; and determining the one or more regions based upon the filtered detections; and determine at least one of a width, length, and height of the trailer based on the identified one or more regions.

7. The sensor of claim 6, wherein the trailer detection processor is further configured to:

adjust alert zone for the vehicle based upon the at least one of width, length, and height of the trailer.

8. The sensor of claim 6, wherein the trailer detection processor is coupled to a user interface, the user interface being configured to:

display the determined width, length, and height of the trailer.

9. The sensor of claim 8, wherein the user interface is further configured to:

display the information on surrounding static infrastructure captured by the signal processor.

10. The sensor of claim 6, further comprising:

a second transceiver, wherein the second transceiver transfers additional reflection signals to the signal processor and the signal processor uses the additional reflection signals to capture information on the surrounding static infrastructure.

* * * * *